US008651501B1

(12) United States Patent  
Davis

(10) Patent No.: US 8,651,501 B1
(45) Date of Patent: Feb. 18, 2014

(54) THREE WHEELED AUTOMOTIVE DOLLY

(76) Inventor: Steven Davis, Sturgeon Bay, WI (US)

(*) Notice: Subject to any disclaimer, the term of this patent is extended or adjusted under 35 U.S.C. 154(b) by 126 days.

(21) Appl. No.: 12/977,758

(22) Filed: Dec. 23, 2010

(51) Int. Cl.
*B62B 5/00* (2006.01)

(52) U.S. Cl.
USPC .......... 280/47.35; 280/47.34; 280/79.11; 280/79.4; 280/62; 254/133 R; 254/134; 254/2 B; 254/7 B; 254/8 B; 269/17; 269/296; D34/23; D34/31; 414/430

(58) Field of Classification Search
USPC ............ 280/47.34, 47.35, 79.11, 79.4, 62; 254/133 R, 134, 2 B, 7 B, 8 B; 269/17, 269/296; 414/430; D34/23, 31
See application file for complete search history.

(56) References Cited

U.S. PATENT DOCUMENTS

| 1,114,829 | A | * | 10/1914 | Weaver ................... 254/7 B |
| 1,197,998 | A | | 9/1916 | Beaman |
| 1,211,373 | A | | 1/1917 | Weaver |
| 1,559,391 | A | | 10/1925 | Waters |
| 1,650,810 | A | * | 11/1927 | Weaver ................... 414/428 |
| 1,701,134 | A | | 2/1929 | Waite |
| 1,940,643 | A | * | 12/1933 | Earnest ................... 188/119 |
| 2,259,279 | A | * | 10/1941 | Watter .................... 414/428 |
| 2,335,130 | A | * | 11/1943 | Moran ..................... 254/2 B |
| D139,553 | S | | 11/1944 | McCann |
| 2,463,744 | A | | 3/1949 | Clemens |
| 2,613,083 | A | * | 10/1952 | Moludy ..................... 280/42 |
| 2,940,611 | A | * | 6/1960 | Burch ...................... 414/728 |
| 3,086,751 | A | * | 4/1963 | Poznik ..................... 254/8 B |
| 3,154,200 | A | * | 10/1964 | Versch et al. ............... 414/23 |
| 4,269,394 | A | * | 5/1981 | Gray ....................... 254/134 |
| 4,383,681 | A | | 5/1983 | Walters |
| 4,491,305 | A | * | 1/1985 | Walters .................... 269/17 |
| 4,640,495 | A | | 2/1987 | Parsons |
| D304,118 | S | * | 10/1989 | Snoke et al. ............... D34/31 |
| 4,934,720 | A | * | 6/1990 | Dobron .................. 280/79.11 |
| 5,180,178 | A | * | 1/1993 | Caceres .................. 280/47.34 |
| 5,620,192 | A | | 4/1997 | Demongin |
| 5,941,544 | A | * | 8/1999 | Fiedler .................. 280/47.331 |
| 6,257,094 | B1 | * | 7/2001 | Babich ....................... 81/45 |
| 7,287,766 | B2 | * | 10/2007 | Kilday et al. ............ 280/79.11 |
| 2003/0034483 | A1 | * | 2/2003 | Anderson ................. 254/7 B |
| 2003/0038439 | A1 | * | 2/2003 | Novak et al. ............. 280/79.7 |
| 2003/0141686 | A1 | * | 7/2003 | Willis .................... 280/47.34 |
| 2006/0192060 | A1 | | 8/2006 | Opsahl et al. |

* cited by examiner

*Primary Examiner* — J. Allen Shriver, II
*Assistant Examiner* — Hilary L Johns
(74) *Attorney, Agent, or Firm* — Gold & Rizvi, P.A.; Glenn E. Gold

(57) ABSTRACT

A mobile and adjustable dolly having an adjustable "V" shaped dolly frame. The dolly frame comprises first and second pivotal frame members rotationally coupled to a central support frame member forming a "V" shape. The central support frame member comprises a series of angle maintaining features for securing each frame member at any of a plurality of angled configurations. A distal caster, having a wheel rotation disposed therewith, is assembled to a distal end of each frame member and a central caster is assembled to a pivotal region of the dolly frame. A vehicle support subassembly is disposed upon and extends upward from the each respective frame member. An elongated handle assembly extends from the central caster. The elongated handle assembly further comprises a wheel chock, which removably engages with the central wheel when subjected to the weight of the elongated handle assembly.

20 Claims, 7 Drawing Sheets

THREE WHEELED AUTOMOTIVE DOLLY

FIELD OF THE INVENTION

The present disclosure generally relates to an apparatus for supporting and moving automotive vehicles. More particularly, the present disclosure relates to an adjustable "V" shaped dolly that may be used to physically support and mobilize an automotive vehicle.

BACKGROUND OF THE INVENTION

In the field of automotive repair and maintenance there is often a need to raise, support, and move an immobile vehicle.

One common means for moving an immobile vehicle is by using a plurality of typical hydraulic floor jacks. Moving a vehicle with floor jacks can be difficult because all of the floor jacks need to be oriented and rolled in unison. Additionally, the small wheels on the floor jack have a high rolling resistance when under a heavy load. Another method of moving an immobile vehicle is to place wheel dollies under each wheel. Wheel dollies can cause wheel "set" if used for an extended period of time. Wheel dollies also have small wheels, which make moving the immobile vehicle difficult.

Another device for moving an immobile vehicle is to use the automobile dolly including a fixed A-shaped frame having leg members connected at their mid-section by a cross member and at an apex by a connecting plate. The device shape is bulky, which limits access to the vehicle. The "A" shaped frame design dictates the use of multiple jacks to raise the vehicle onto the dolly.

What is desired is a dolly providing a stable platform for supporting and moving an immobile vehicle. The preferred dolly maximizes access to the vehicle for servicing. The dolly should also be able to be moved easily while supporting the weight of an automotive vehicle.

SUMMARY OF THE INVENTION

The basic inventive concept provides a method for supporting and mobilizing an automotive vehicle while being worked on.

In a first aspect of the present invention, a dolly is provided for supporting and mobilizing an automotive vehicle, the dolly comprising:

central frame support member;

a first pivotal frame member having a first pivotal end and a distal end, the first pivotal end being pivotally attached to said central frame support plate;

a second pivotal frame member having a second pivotal end and a distal end, the second pivotal end being pivotally attached to said central frame support plate;

a central wheel being assembled to said central frame support plate;

a pair of distal wheels, each wheel being assembled to said distal end of each pivotal frame member, respectively;

a pair of vehicle support columns, each vehicle support column being assembled to a central segment of each pivotal frame member, respectively;

wherein the first pivotal frame member and the second pivotal frame member form an adjustable "V" shape, wherein all rigid assembly connections between the first and second pivotal frame members occur proximate the central wheel.

A second aspect of the present invention is an apparatus wherein the first and second pivotal frame members are rotationally positionable such that a distance between the distal end of the first pivotal frame member and the distal end of the second pivotal frame member may be adjusted, the first and second pivotal frame members being pivotally coupled to the central frame support member at the pivotal ends thereof.

In yet another aspect, the adjustable vehicle support subassembly can be centrally positioned along a length of the respective pivotal frame member.

In yet another aspect, the vehicle support subassembly can be positioned at a distance from the distal end that is approximately one-third of the overall length of the respective pivotal frame member. It is preferred that the vehicle support subassembly is vertically adjustable.

In yet another aspect, the region formed between the first and second pivotal frame members is unobstructed such that the dolly may be positioned straddling a hydraulic floor jack between the pivotal frame members allowing the vehicle to be raised by a single hydraulic jack.

In yet another aspect, a diameter of the central and distal wheels is sufficient to roll on a hard surface, including an ability to easily roll over small cracks and imperfections or non-planar features that may occur in a ground surface, such as tile, bricks, and the like. One suggested wheel diameter is 8".

In yet another aspect, the diameter of the central and distal wheels is at least half the height of the dolly. It is preferred that the central and distal wheels all have equal diameters.

In yet another aspect of the present invention, the height of the adjustable vehicle support subassemblies is less than the diameter of the central and distal wheels.

In yet another aspect, the apparatus may be used in tandem with a second, identical dolly to support and move an automotive vehicle.

In yet another aspect, the dolly further comprises an elongated handle assembly. The elongated handle assembly is preferably removably attached to the dolly.

In yet another aspect, the removable elongated handle assembly further comprises a wheel chock, which removably engages with the central wheel. The wheel chock preferably engages under the weight of the elongated handle assembly.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
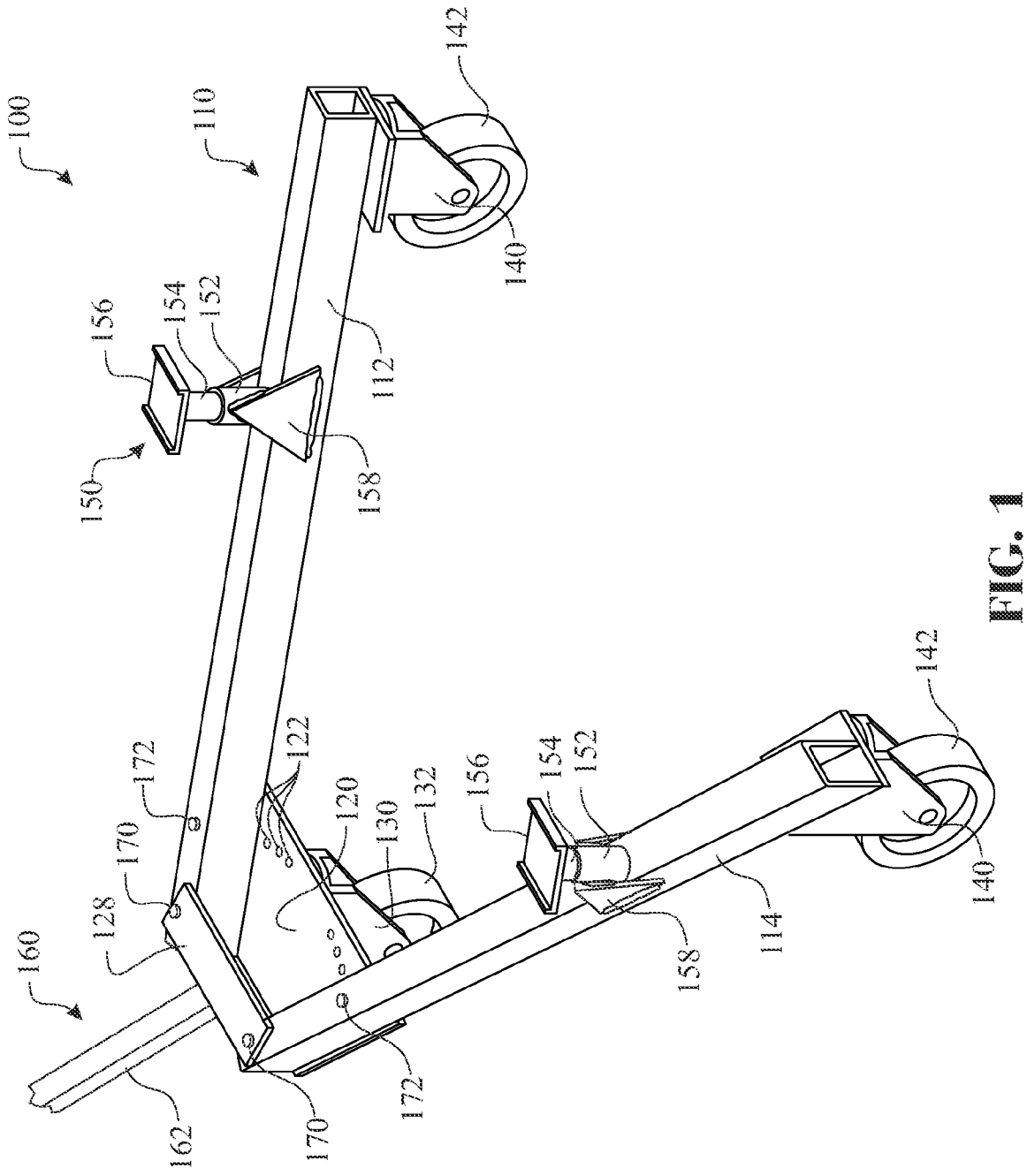
FIG. 1 presents an isometric view of an exemplary embodiment of a vehicle dolly.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
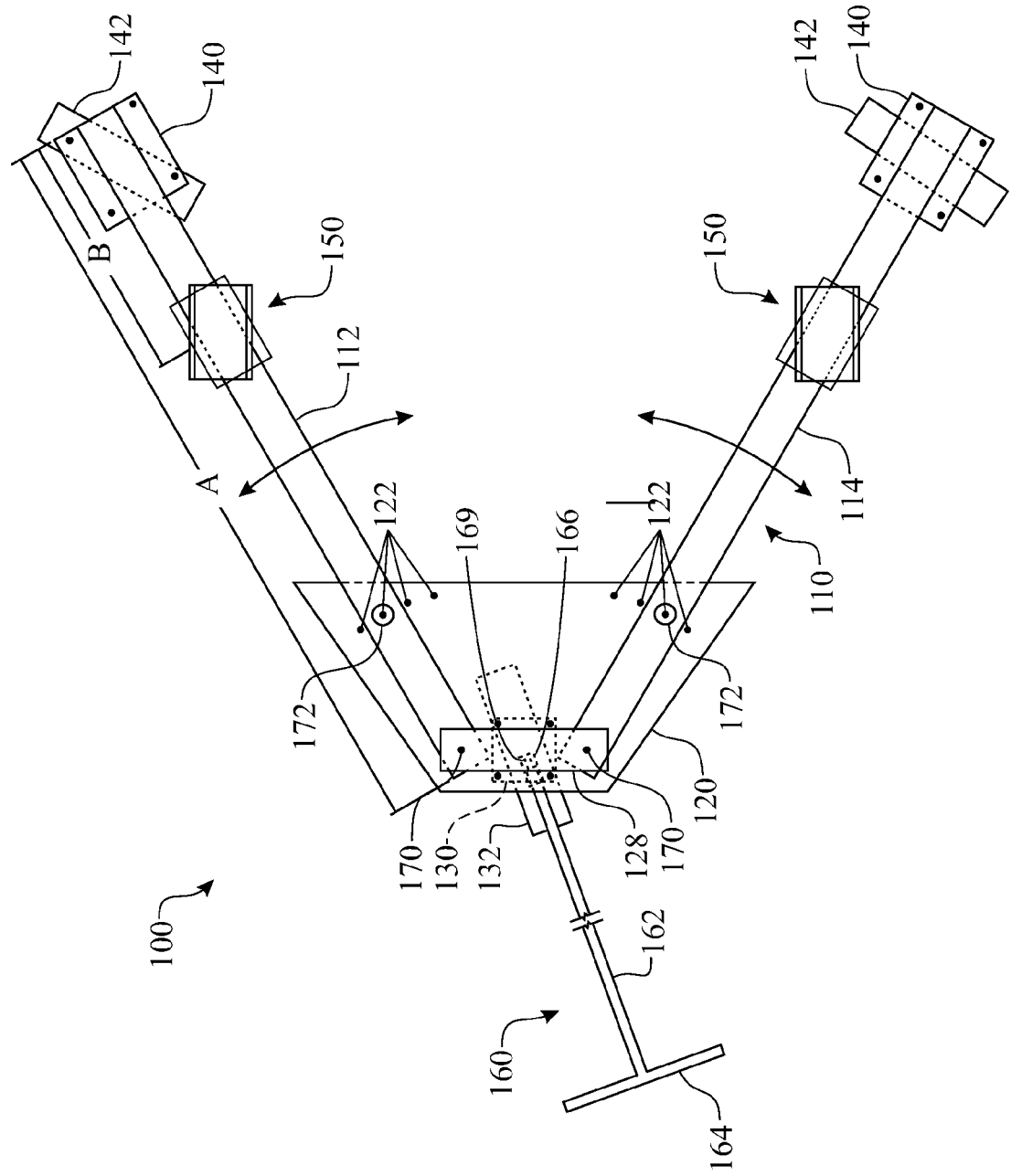
FIG. 2 presents a top plan view of the vehicle dolly originally introduced in FIG. 1.

A dolly 100 is provided to support and mobilize an automotive vehicle while being built, restored, serviced, maintained, and the like. An exemplary dolly 100 is presented in FIGS. 1 through 3. A primary component of the dolly 100 is a dolly frame 110. The dolly frame 110 includes a first pivotal frame member 112 and a second pivotal frame member 114, which are pivotally attached to a central frame support member 120. The exemplary central frame support member 120 is assembled, contacting a lower surface of the pivotal frame members 112, 114. A second central frame support member 128 can be assembled, contacting an upper surface of the pivotal frame members 112, 114 increasing the rigidity and reliability of the dolly frame 110. Alternately, the central frame support member 120 and second central frame support member 128 can be provided in a unitary structure. An arm member pivot pins 170 is used to pivotally assemble the pivotal frame members 112, 114 to the central frame support member 120 and second central frame support member 128.

The pivotal frame members 112, 114 can be fabricated of mild tubular steel, such as a 2"×3" tubular box extrusion having a ¼ inch wall thickness. It is understood that the pivotal frame members 112, 114 can be fabricated of any material, including rods, any tubular extrusion, I-beams, T-Beams, "C" channels, Angles, and the like. The pivotal frame members 112, 114 may be fabricated of any reasonable material suitable to support a predetermined maximum load. The pivotal frame members 112, 114 may additional include an arch to increase the overall strength of the dolly frame 110.

Figure 4:
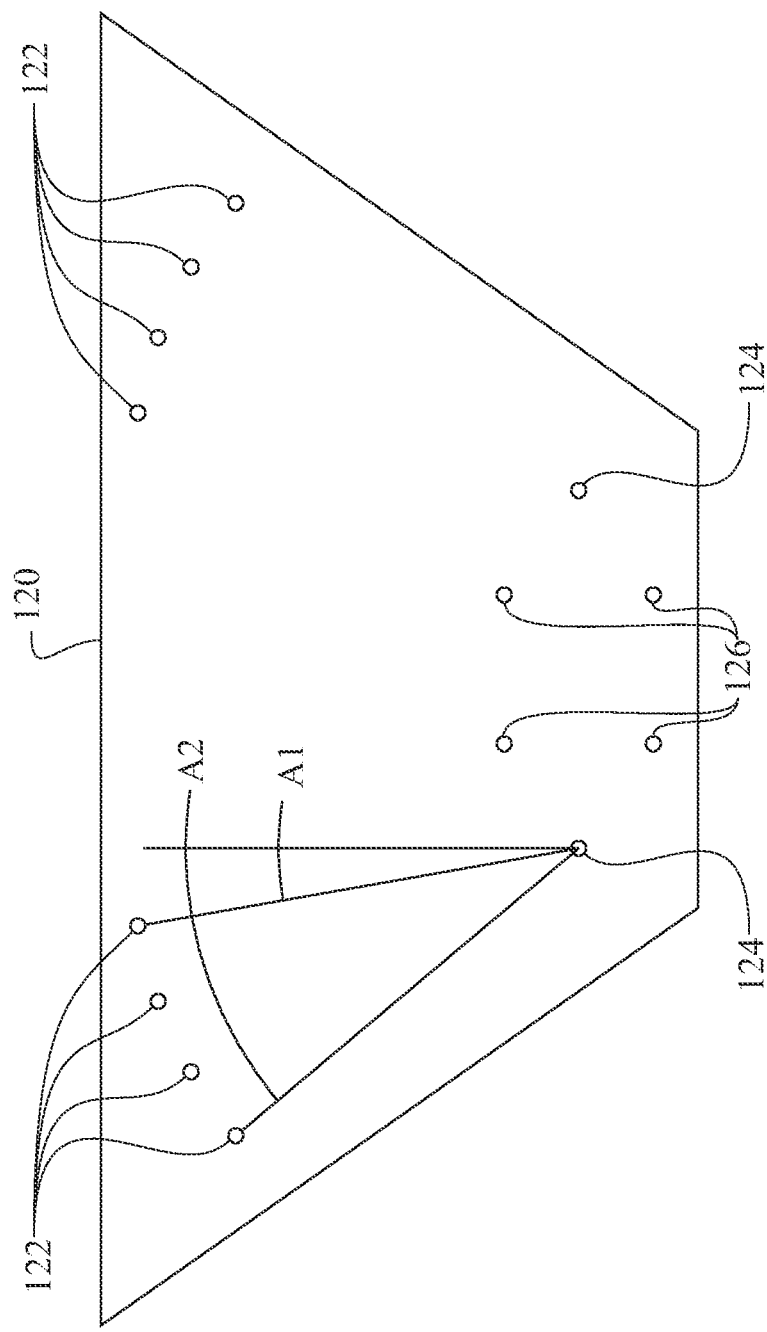
FIG. 4 presents a detailed top plan view of a central frame support member, which provides a pivotal assembly of the vehicle dolly.

The pivotal motion and angular adjustments of the pivotal frame members 112, 114 are governed by features incorporated into the central frame support member 120. Details of the central frame support member 120 are presented in FIG. 4. An arm pivot aperture 124 is provided through the central frame support member 120 for receiving the arm member pivot pins 170, thus defining the pivot location of each respective pivotal frame member 112, 114. A pair of series of angle defining apertures 122 is provided through the central frame support member 120 for locking each respective pivotal frame member 112, 114 in a predetermined angle. Each series of angle defining apertures 122 are arranged along an arc, where the arc is generated using an arm pivot aperture 124 as a radial center. The series of angle defining apertures 122 can be spatially arranged at any predetermined angle. The exemplary embodiment positioned each of the angle defining apertures 122 at 10 degree increments, having an initial angle referenced as "A1" of 10 degrees and a final angle referenced as "A2" of 40 degrees from a longitudinal reference. An angle adjustment pin 172 is removably inserted through a respective angle retention aperture (understood to be under and receive the angle adjustment pins 172) provided through each pivotal frame member 112, 114 and into the desired angle defining apertures 122. The angle retention aperture is located at a distance equal to the radial distance defined between the arm pivot aperture 124 and each angle defining apertures 122. The user rotates each respective pivotal frame member 112, 114 about the arm member pivot pins 170 into the desired angle and secures the respective pivotal frame member 112, 114 in position by inserting the angle adjustment pins 172 into the nearest angle defining apertures 122. The exemplary dolly frame 110 can be arranged having a "V" shape between 20 degrees and 80 degrees. The interior portion of the "V" provides clearance for accessing components under the vehicle, positioning tools therebetween, and the like.

It is understood that the arm pivot aperture 124 and caster mounting apertures 126 can be smooth through holes, threaded through holes, and the like. The angle defining apertures 122 can be smooth through holes, threaded through holes, blind holes, and the like. The style of each hole is respective to the designer's choice. The angle adjustment pins 172 can be retained using any commonly known retention component, including a threaded section, a cotter pin, a "C" clip, and the like.

An adjustable vehicle support subassembly 150 is attached to each of the pivotal frame members 112, 114. Each adjustable vehicle support subassembly 150 can be permanently fixed to each respective pivotal frame member 112, 114 as illustrated or be slideably adjusting along a length of the respective pivotal frame members 112, 114. The adjustable vehicle support subassembly 150 is fabricated having a vehicle support column 152 for receiving a vehicle support adjustment column 154. The vehicle support column 152 extends upright from the respective pivotal frame member 112, 114. In a fixed configuration, a vehicle support attachment gusset 158 can be utilized to attach and support the vehicle support column 152 in the proper orientation using any reasonable mechanical attachment means. In a slideably configuration, any known slideable interface can be provided between the vehicle support column 152 and the respective pivotal frame member 112, 114. A vehicle support plate 156 is provided upon an upper end of the vehicle support adjustment column 154 for distributing a supported load across a contacting surface. In the exemplary embodiment, the vehicle support adjustment column 154 slides into the vehicle support column 152, creating a vertically adjustable interface. A locking pin or other locking device can be deployed to vertically position the vehicle support plate 156. Additionally, a round cross sectional shape allows the user to rotate the vehicle support plate 156 into the desired orientation. It is understood that other symmetric cross sectional shapes allow the user to angularly position the vehicle support plate 156 respective to the specific shape provided.

A plurality of wheels 132, 142 can be assembled to the dolly frame 110 to provided mobility to the dolly 100. The wheels can be rotationally attached to the dolly frame 110 by a caster 130, 140. An exemplary vertex caster 130 is attached to the central frame support member 120 by inserting threaded fasteners through a plurality of caster mounting apertures 126 and a similarly patterned series of apertures provided through the vertex caster 130. The vertex caster 130 provides directional rotation of the central wheel 132, rotating about a vertical axis. The central wheel 132 is rotationally assembled to the vertex caster 130, rotation about a horizontal axis. A pair of distal casters 140 is assembled to the dolly frame 110, where each distal caster 140 is assembled to a distal end of the respective pivotal frame member 112, 114. The distal wheel 142 is assembled to the distal caster 140 in a manner similar to the assembly of the central wheel 132 to the vertex caster 130. The three wheels 132, 142 extend downward from the dolly frame 110 creating a mobile planar support surface. The casters 130, 140 can be of any swivel design. They can be assembled to the dolly frame 110 by any mechanical assembly interface, including mechanical fasteners, welding, and the like. The casters 130, 140 can include swivel locks, wheel locks, and any other feature commonly associated with a caster. The wheels 132, 142 may be of any form factor, including low deflection tires, pneumatic tires, steel tires, plastic tires, and the like, while taking a load rating into consideration.

Figure 5:
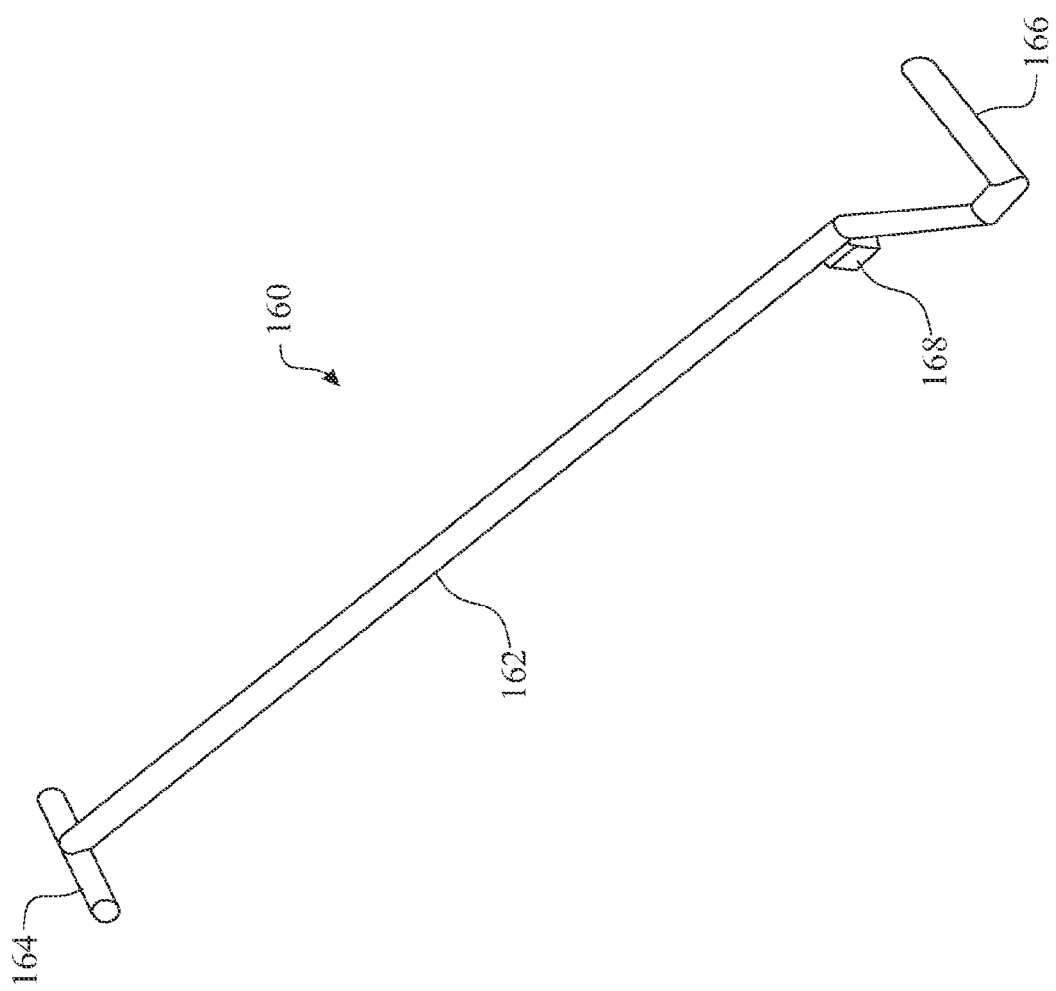
FIG. 5 presents an isometric view of an exemplary elongated handle assembly.

An elongated handle assembly 160 can be removably and/or pivotally attached to the dolly frame 110 using any reasonable interface configuration. One exemplary elongated handle assembly 160 is illustrated in FIG. 5. The elongated handle assembly 160 is fabricated having a handle grip member 164 perpendicularly attached to a grip end of a elongated handle member 162 and a dolly engagement member 166 provided at an attachment end of the elongated handle member 162. The handle grip member 164 is fabricated of a shape, size, and material that is conducive to the assembly process and comfortable for the user. The dolly engagement member 166 can include a section of material to offset the attachment end of the elongated handle member 162, allowing the central longitudinal axis of the elongated handle member 162 to align with a midpoint of the dolly engagement member 166. The elongated handle assembly 160 is preferably fabricated of round tubular stock. Each section being cut to the desired length and the components are then welded together. A wheel chock 168 can be attached extending downward from the attachment end of the elongated handle member 162. The dolly engagement member 166 is slipped into a handle receiving member 169. The handle receiving member 169 is preferably attached to the vertex caster 130, wherein when the user rotates the elongated handle assembly 160; the user is also redirecting the rotation of the central wheel 132. The unsupported weight of the elongated handle assembly 160 lowers the wheel chock 168, causing the wheel chock 168 to rest against the central wheel 132 and creating a wheel-braking interface.

The dolly 100 has been reduced to practice, using the following exemplary dimensions. A length of each pivotal frame member 112, 114 (referenced as "A" in FIG. 2) is 36 inches. An overall height of the dolly 100 is 17½ inches (referred to as "C" in FIG. 3). Each adjustable vehicle support subassembly 150 is located at a distance from the distal end that is ⅓ of the overall length of the pivotal frame member 112, 114 (referred to as "B" in FIG. 2). A distance between each of the arm pivot aperture 124, providing the rotational points for each pivotal frame member 112, 114 is preferably 8 inches. It is understood the pivot location 124 for each of the pivotal frame members 112, 114 can be separated as illustrated or overlapping, using the same rotational axle location. The vehicle support plate 156 can be any reasonable size with the exemplary embodiment being a 5 inch square having one pair of parallel edges bent upwards. The exemplary elongated handle assembly 160 was fabricated having a length of 48 inches.

Figure 3:
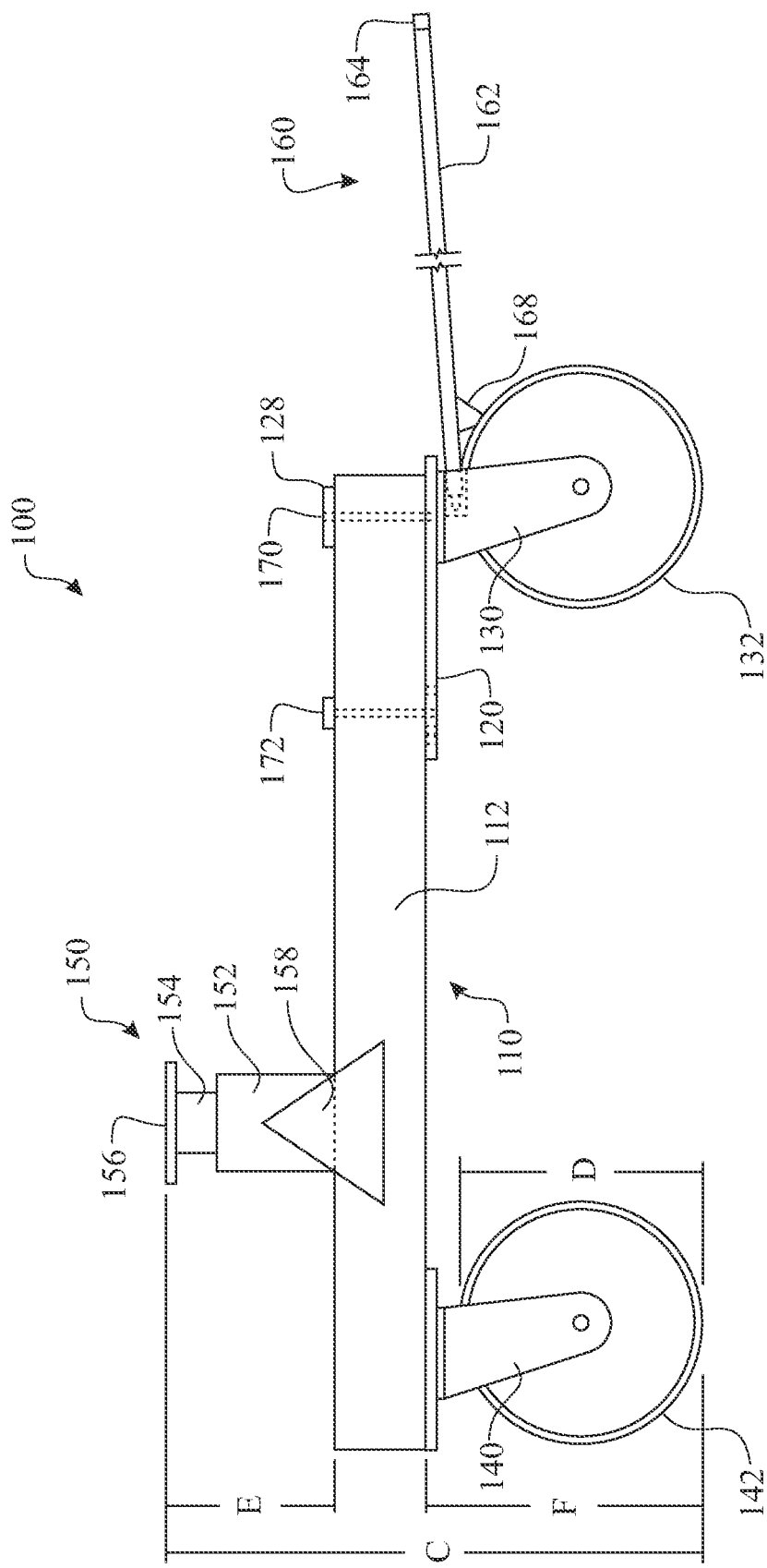
FIG. 3 presents a side elevation view of the vehicle dolly originally introduced in FIG. 1.

The wheels 132, 142 can be provided having a diameter (referenced as "D" in FIG. 3) that is at least equal to a height of the adjustable vehicle support subassembly 150, or more specifically, a distance between a top surface of the pivotal frame member 112, 114 and the top surface of the vehicle support plate 156 (referenced as "E" in FIG. 3). It is desirable to provide a caster 130, 140 and wheel 132, 142 combination (and any spacers as required) to provide a vertical clearance (referenced as "F" in FIG. 3) between the ground surface 350 and an underside surface of the pivotal frame member 112, 114 that allows a hydraulic floor jack 200 to pass thereunder. In the exemplary embodiment, the clearance is 9¾ inches.

Figure 6:
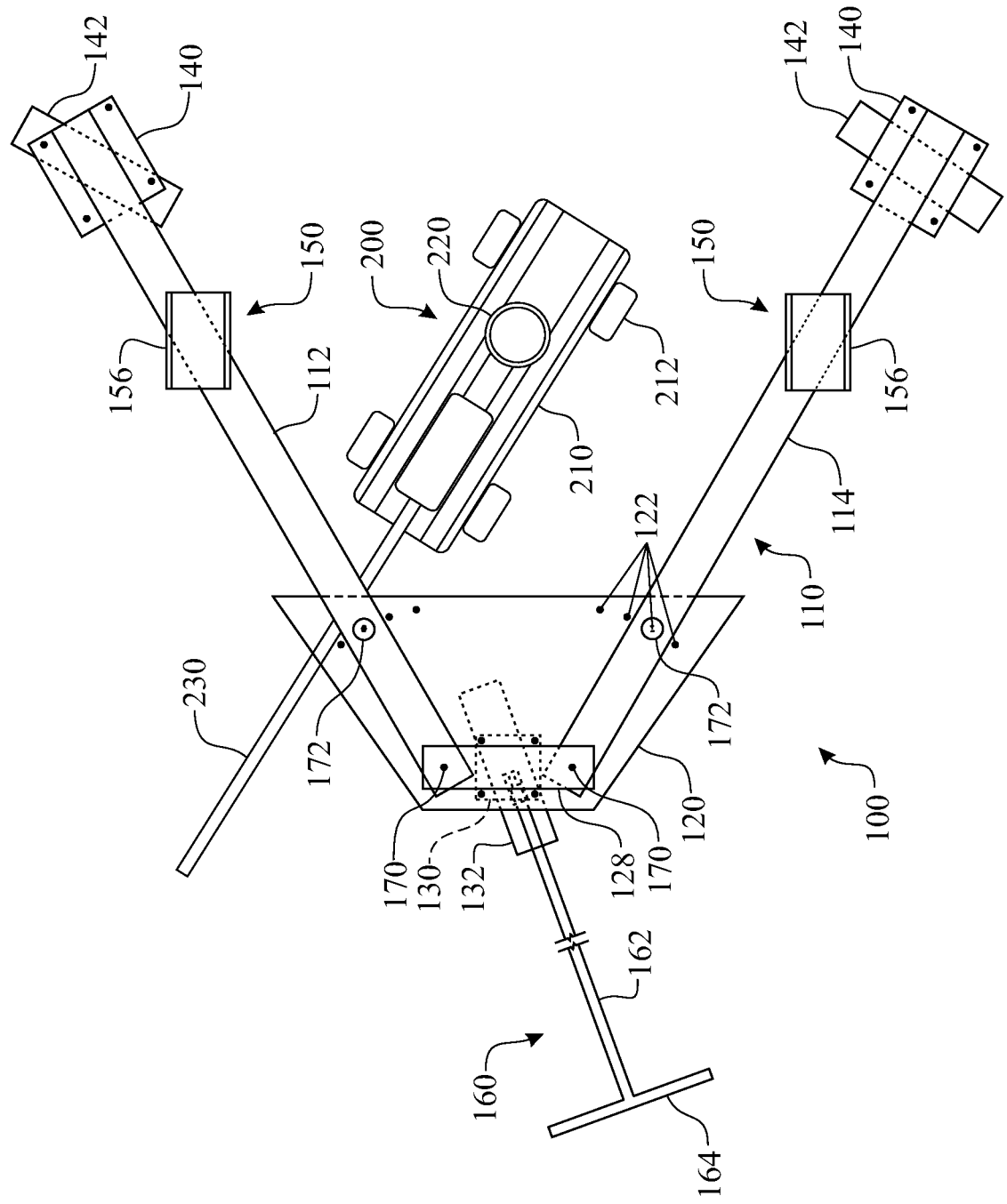
FIG. 6 presents a top view of the vehicle dolly used in combination with a hydraulic floor jack.
Figure 7:
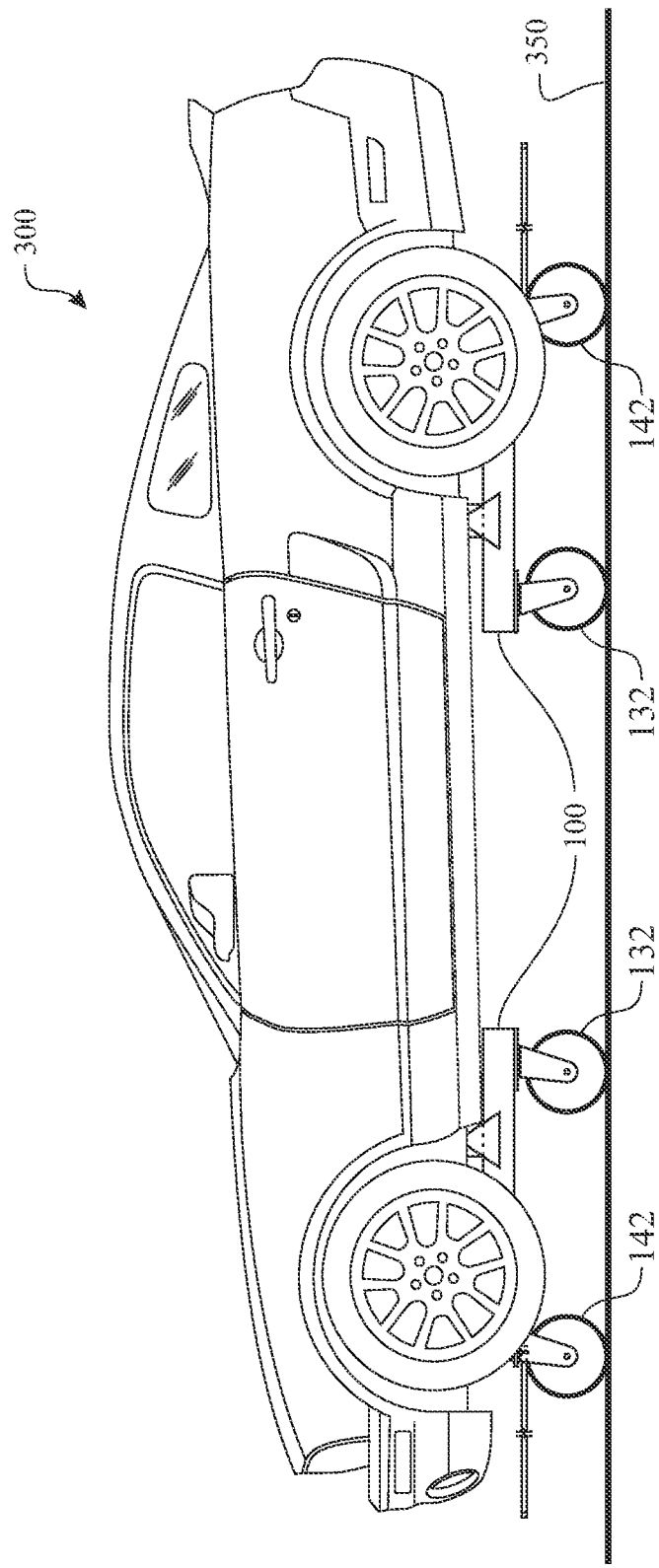
FIG. 7 presents a side elevation view illustrating an exemplary application of a pair of vehicle dollies supporting a vehicle.

An exemplary application of the dolly 100 is presented in FIGS. 6 and 7. The vehicle technician or enthusiast would configured the dolly 100 by determining a desired span between each of the adjustable vehicle support subassemblies 150 which would position each of the vehicle support plate 156 respective to a sufficient vehicle support member. The user would then pivot the pivotal frame members 112, 114 about the arm member pivot pins 170 to the desired angle. The user locks the pivotal frame members 112, 114 into position by inserting the 172 through the pivotal frame member 112, 114 and into the respective angle defining apertures 122. The technician obtains a hydraulic floor jack 200 for lifting the automotive vehicle 300. The hydraulic floor jack 200 includes a hydraulic jack support plate 220 operatively controlled within a hydraulic jack body 210. A plurality of hydraulic jack wheels 212 is rotationally attached to the hydraulic jack body 210, providing mobility to the hydraulic floor jack 200. A hydraulic jack handle 230 is attached to the hydraulic jack body 210, providing vertical control as well as a means for directing any rolling motion of the hydraulic floor jack 200. The technician raises the vehicle to the minimum required height by centrally positioning the hydraulic floor jack 200 (FIG. 6) underneath a automotive vehicle 300 (FIG. 7) aligning the hydraulic jack support plate 220 with a sufficient vehicle support member. The technician raises the automotive vehicle 300 to a height above the ground surface 350 that is greater than the height of the dolly 100, allowing the dolly 100 to be freely positioned under the vehicle. The "V" shape of the dolly frame 110 allows the technician to position the dolly 100 to straddle the hydraulic floor jack 200 as illustrated. The dolly 100 is positioned, aligning each of the vehicle support plate 156 with a desired support feature of the automotive vehicle 300. During the positioning of the dolly 100, the hydraulic jack handle 230 is routed under the respective frame member 112, 114. The clearance between the ground surface 350 and a bottom surface of the frame member 112, 114 is greater than an overall height of the hydraulic floor jack 200. This allows the technician to roll the hydraulic floor jack 200 under the dolly frame 110. The technician slowly lowers the hydraulic jack support plate 220, resting the automotive vehicle 300 onto the vehicle support plate 156. Once the hydraulic floor jack 200 is lowered and no longer supporting the automotive vehicle 300, the technician can remove the hydraulic floor jack 200 from the working area. The process can be repeated, utilizing a second dolly 100 to support an opposite end of the automotive vehicle 300 as illustrated in FIG. 7.

When work on the automotive vehicle 300 is completed, the process is reversed to remove each of the dollies 100 from supporting the automotive vehicle 300. The elongated handle assembly 160 can be removed and each of the pivotal frame member 112, 114 can be rotated into a parallel configuration for compact storage.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A mobile and adjustable dolly for moveably supporting an object, comprising:
   a central frame support member having a substantially horizontal orientation, said central frame support member comprising a first member pivot location and a first series of angle defining apertures, each of said angle defining apertures being spatially located along a first arch having a constant radius from said first member pivot location and a second member pivot location and a second series of angle defining apertures, each of said second angle defining apertures being spatially located along a second arch having a constant radius from said second member pivot location;
   a first pivotal frame member having extending between a first frame member pivotal end and a first frame member distal end thereof, said first frame member pivotal end being pivotally attached to said central frame support member aligning a first pivotal frame member pivot location of said first pivotal frame member at said first member pivot location;
   a first pivotal frame member angle adjustment aperture formed through said first pivotal frame member at a distance from said first pivotal frame member pivot location equal to said first arch radius, wherein said first pivotal frame member angle adjustment aperture is selectively aligned and engaging with a predetermined angle defining aperture of said first series of angle defining apertures to maintain said first pivotal frame member in position;
   a second pivotal frame member having extending between a second frame member pivotal end and a second frame member distal end thereof, said second frame member pivotal end being pivotally attached to said central frame support member aligning a second pivotal frame member pivot location of said second pivotal frame member at said second member pivot location;
   a second pivotal frame member angle adjustment aperture formed through said second pivotal frame member at a distance from said second pivotal frame member pivot location equal to said second arch radius, wherein said second pivotal frame member angle adjustment aperture is selectively aligned and engaging with a predetermined angle defining aperture of said second series of angle defining apertures to maintain said second pivotal frame member in position and at an angle respective to said first pivotal frame member;
   a central wheel being assembled to supported by and extending downward from said central frame support member;
   a pair of distal wheels, each wheel being assembled to said distal end of each pivotal frame member, respectively;
   a pair of vehicle support columns, each vehicle support column being one of adjustably assembled to and affixed to a central segment of each pivotal frame member, respectively;
   wherein said first pivotal frame member and said second pivotal frame member are pivotally assembled to said central frame support member in a pivotal "V" shaped configuration, wherein each of the pivotal frame members can be rotated to change an angle formed therebetween and alter a distance spanning between said first frame member distal end and said second frame member distal end form an adjustable "V" shape, wherein all rigid assembly connections between said first and second pivotal frame members occur proximate said central wheel,
   wherein said central frame support member is sized and located at a pivot end of said mobile and adjustable dolly creating an open "V shape enabling said first pivotal frame member and said second pivotal frame member to roll into location straddling any object exclusive of any interference from said mobile and adjustable dolly.

2. A mobile and adjustable dolly as recited in claim 1, wherein said central frame support member is positioned proximate engaging with a first surface of said first and second pivotal frame members and a second frame support member is positioned proximate an engaging with a second, opposite, surface of said first and second pivotal frame members.

3. A mobile and adjustable dolly as recited in claim 1, said vehicle support columns further comprising a vertically adjustable interface for a height adjustment.

4. A mobile and adjustable dolly as recited in claim 1, each vehicle support columns further comprises comprising a slideably adjustable interface for a height adjustment, wherein said sliding motion is provided along a longitudinal axis of said vertical support column.

5. A mobile and adjustable dolly as recited in claim 4, at least one vehicle support column further comprises comprising a rotationally adjustable interface for angularly orientating a vehicle support plate, wherein said rotation is provided about a vertical said longitudinal axis of said vertical support column.

6. A mobile and adjustable dolly as recited in claim 1, at least one vehicle support column further comprises comprising a rotationally adjustable interface for angularly orientating a vehicle support plate, wherein said rotation is provided about a vertical said longitudinal axis of said vertical support column.

7. A mobile and adjustable dolly as recited in claim 1, wherein each vehicle support column is fixed affixed to a respective said pivotal frame member respectively.

8. A mobile and adjustable dolly for moveably supporting an object, comprising:
   a central frame support member having a substantially horizontal orientation, said central frame support member comprising at least one arm pivot aperture and a plurality of angle defining apertures, wherein each angle defining aperture of the plurality of angle defining apertures is located along an arch that is radially and equidistant from said respective arm pivot aperture;
   a first pivotal frame member having a first pivotal end and a distal end, said first pivotal end being pivotally attached to said arm pivot aperture of said central frame support member and maintained at an angled configuration by engaging with one of said plurality of angle defining apertures aligning a first pivotal frame member pivot location of said first pivotal frame member with a respective arm pivot aperture of said at least one arm pivot aperture;
   a first pivotal frame member angle adjustment aperture formed through said first pivotal frame member at a distance from said first pivotal frame member pivot location equal to said equidistant arch radius, wherein said first pivotal frame member angle adjustment aperture is selectively aligned and engaging with a predetermined angle defining aperture of said plurality of angle defining apertures to maintain said first pivotal frame member in position;
   a second pivotal frame member having a second pivotal end and a distal end, said second pivotal end being pivotally attached to said arm pivot aperture of said central frame support member and maintained at an angled configuration by engaging with one of said plurality of angle defining apertures aligning a second pivotal frame member pivot location of said second pivotal frame member with a respective arm pivot aperture of said at least one arm pivot aperture;

a second pivotal frame member angle adjustment aperture formed through said second pivotal frame member at a distance from said second pivotal frame member pivot location equal to said equidistant arch radius, wherein said second pivotal frame member angle adjustment aperture is selectively aligned and engaging with a predetermined angle defining aperture of said plurality of angle defining apertures maintain said second pivotal frame member in position and at an angle respective to said first pivotal frame member;

a central wheel being assembled to said central frame support member;

a pair of distal wheels, each wheel being assembled to said distal end of each pivotal frame member, respectively;

a pair of vehicle support columns, each vehicle support column being one of adjustably assembled to and affixed to a central segment of each pivotal frame member, respectively;

wherein said first pivotal frame member and said second pivotal frame member are pivotally assembled to said central frame support member in a pivotal "V" shaped configuration, wherein each of the pivotal frame members can be rotated to change an angle formed therebetween and alter a distance spanning between said first frame member distal end and said second frame member distal end form an adjustable "V" shape, wherein all rigid assembly connections between said first and second pivotal frame members occur proximate said central wheel, wherein said central frame support member is sized and located at a pivot end of said mobile and adjustable dolly creating an open "V shape enabling said first pivotal frame member and said second pivotal frame member to roll into location straddling any object exclusive of any interference from said mobile and adjustable dolly.

9. A mobile and adjustable dolly as recited in claim 8, wherein said central frame support member is positioned proximate engaging with a first surface of said first and second pivotal frame members and a second frame support member is positioned proximate an engaging with a second, opposite, surface of said first and second pivotal frame members.

10. A mobile and adjustable dolly as recited in claim 8, said vehicle support columns further comprising a vertically adjustable interface for a height adjustment.

11. A mobile and adjustable dolly as recited in claim 8, each vehicle support columns further comprises comprising a slideably adjustable interface for a height adjustment, wherein said sliding motion is provided along a longitudinal axis of said vertical support column.

12. A mobile and adjustable dolly as recited in claim 8, at least one vehicle support column further comprises comprising a rotationally adjustable interface for angularly orientating a vehicle support plate, wherein said rotation is provided about a vertical said longitudinal axis of said vertical support column.

13. A mobile and adjustable dolly as recited in claim 8, further comprising an elongated handle assembly moveably attached to a section of said dolly proximate said central wheel.

14. A mobile and adjustable dolly as recited in claim 13, the elongated handle assembly being attached in a manner to rotate said central wheel about a vertical axis providing direction for a motion of said dolly.

15. A mobile and adjustable dolly for moveably supporting an object, comprising:
a central frame support member having a substantially horizontal orientation, said central frame support member comprising at least one arm pivot aperture and a plurality of angle defining apertures, wherein each angle defining aperture of the plurality of angle defining apertures is located along an arch that is radially and equidistant from said respective arm pivot aperture;

a first pivotal frame member having a first pivotal end and a distal end, said first pivotal end being pivotally attached to said arm pivot aperture of said central frame support member and maintained at an angled configuration by engaging with one of said plurality of angle defining apertures aligning a first pivotal frame member pivot location of said first pivotal frame member with a respective arm pivot aperture of said at least one arm pivot aperture;

a first pivotal frame member angle adjustment aperture formed through said first pivotal frame member at a distance from said first pivotal frame member pivot location equal to said equidistant arch radius;

a first angle adjustment pin, wherein said first pivotal frame member angle adjustment aperture is selectively aligned and engaging with a predetermined angle defining aperture of said plurality of angle defining apertures and said first angle adjustment pin is inserted through said predetermined angle defining aperture and into said first pivotal frame member angle adjustment aperture to maintain said first pivotal frame member in position;

a second pivotal frame member having a second pivotal end and a distal end, said second pivotal end being pivotally attached to said arm pivot aperture of said central frame support member and maintained at an angled configuration by engaging with one of said plurality of angle defining apertures aligning a second pivotal frame member pivot location of said second pivotal frame member with a respective arm pivot aperture of said at least one arm pivot aperture;

a second pivotal frame member angle adjustment aperture formed through said second pivotal frame member at a distance from said second pivotal frame member pivot location equal to said equidistant arch radius;

a second angle adjustment pin, wherein said second pivotal frame member angle adjustment aperture is selectively aligned and engaging with a predetermined angle defining aperture of said plurality of angle defining apertures and said second angle adjustment pin is inserted through said predetermined angle defining aperture and into said second pivotal frame member angle adjustment aperture to maintain said second pivotal frame member in position and at an angle respective to said first pivotal frame member;

a central wheel being assembled to a central caster, said central caster providing said central wheel with directional rotation about a vertical axis, wherein said central caster is assembled to said central frame support member;

a pair of distal wheels to a distal caster, said distal caster providing said distal wheel with directional rotation about a vertical axis, wherein said distal caster is assembled to said distal end of each pivotal frame member, respectively;

a pair of vehicle support columns, each vehicle support column being one of adjustably assembled to and affixed to a central segment of each pivotal frame member, respectively;

wherein said first pivotal frame member and said second pivotal frame member are pivotally assembled to said central frame support member in a pivotal "V" shaped configuration, wherein each of the pivotal frame members can be rotated to change an angle formed therebetween and alter a distance spanning between said first frame member distal end and said second frame member distal end form an adjustable "V" shape, wherein all rigid assembly connections between said first and second pivotal frame members occur proximate said central wheel, wherein said central frame support member is sized and located at a pivot end of said mobile and adjustable dolly creating an open "V shape enabling said first pivotal frame member and said second pivotal frame member to roll into location straddling any object exclusive of any interference from said mobile and adjustable dolly.

16. A mobile and adjustable dolly as recited in claim 15, wherein said central frame support member is positioned proximate engaging with a first surface of said first and second pivotal frame members and a second frame support member is positioned proximate an engaging with a second, opposite, surface of said first and second pivotal frame members.

17. A mobile and adjustable dolly as recited in claim 16, each vehicle support columns further comprises comprising at least one of:

a slideably adjustable interface for a height adjustment, wherein said sliding motion is provided along a longitudinal axis of said vertical support column, and a rotationally adjustable interface for angularly orientating a vehicle support plate, wherein said rotation is provided about a vertical said longitudinal axis of said vertical support column.

18. A mobile and adjustable dolly as recited in claim 16, said dolly further comprising an elongated handle assembly pivotally attached to said central caster.

19. A mobile and adjustable dolly as recited in claim 16, said dolly further comprising an elongated handle assembly removably and pivotally attached to said central caster.

20. A mobile and adjustable dolly as recited in claim 18, said elongated handle assembly further comprising a wheel chock located proximate assembled to said mobile and adjustable dolly in a manner to selectively engage with said central wheel caster, wherein a weight of said elongated handle assembly causes said wheel chock to rest against and apply a braking force to said central wheel.

* * * * *